No. 663,540. Patented Dec. 11, 1900.
H. G. HANSEN.
BAG TIE.
(Application filed Mar. 31, 1900.)
(No Model.)

Witnesses.
A. H. Opsahl.
Elgie H. Evans

Inventor.
Hans G. Hansen
By his Attorneys
Merwin Lothrop & Johnson

UNITED STATES PATENT OFFICE.

HANS G. HANSEN, OF HOWARD LAKE, MINNESOTA.

BAG-TIE.

SPECIFICATION forming part of Letters Patent No. 663,540, dated December 11, 1900.

Application filed March 31, 1900. Serial No. 10,944. (No model.)

*To all whom it may concern:*

Be it known that I, HANS G. HANSEN, a citizen of the United States, residing at Howard Lake, in the county of Wright and State of Minnesota, have invented certain new and useful Improvements in Sack-Ties, of which the following is a specification.

My invention relates to improvements in devices for holding the end of a filled sack closed, its object being to provide a device which will hold the end of the sack closed without the possibility of slipping or loosening and which can be easily removed and used an indefinite number of times.

To this end my invention consists in the features of construction and combination hereinafter specifically described and claimed.

Figure 1:
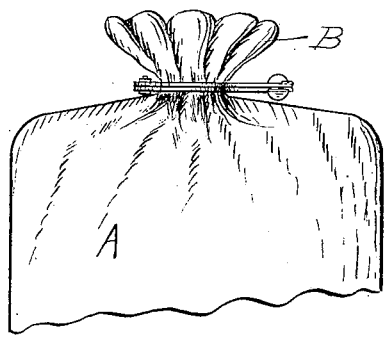
Figure 2:
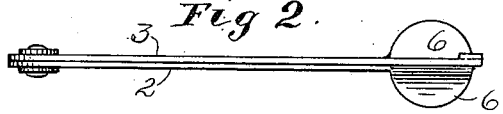
Figure 3:
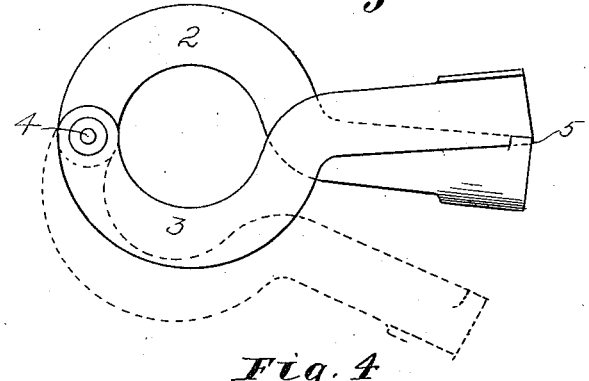

In the accompanying drawings, forming part of this specification, Figure 1 is a partial view of a sack, showing its end held in closed position by my device. Fig. 2 is a side elevation. Fig. 3 is a plan view of my device; and Figs. 4 and 5 are side elevations and plan views, respectively, of a modified form of device.

In the drawings, A represents the sack, and B its open end. My device consists of members 2 and 3, having pivotal connection 4, the inner ends of the members 2 and 3 being outwardly curved to form a central opening, as shown in Fig. 3. The free ends of the members 2 and 3 are substantially straight, and the end of one of the members is formed with a notch 5 to receive the end of the opposite member, as shown in Fig. 3, although the notch may be formed anywhere along the member. The free ends of the members 2 and 3 are preferably formed with finger-holds 6.

In use when it is desired to close a sack the members 2 and 3 are turned upon their pivot to open position. The loose end of the sack is then placed between the members and the members closed to grip the loose end of the sack in the opening between the inner ends of the members 2 and 3. When the members 2 and 3 are turned to closed position, the end of the member 3 is carried past the notch 5 and allowed to rest therein, as shown in Fig. 3. The pressure of the end of the sack between the members will hold the device closed. When it is desired to release the device from the sack, the members are turned upon their pivots sufficiently to release the members 3 from the notch 5, and the members are then turned to open position.

Figure 4:
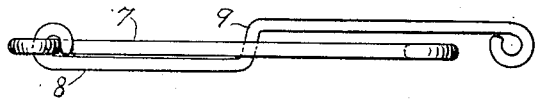
Figure 5:
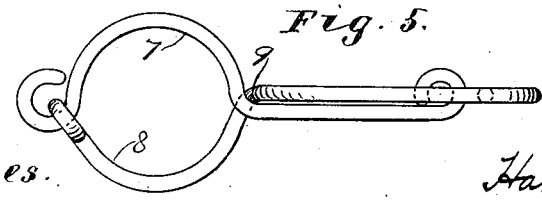

In the modification shown in Fig. 4 the device is made out of wire, consisting of two members 7 and 8, corresponding to members 2 and 3 in the preferred form. Instead of the notch 5 the member 7 is formed with an offset 9, against which the opposite member bears when closed.

I claim—

1. A bag-fastener consisting of two members pivotally secured together, the pivoted ends of the members being outwardly curved to form an intermediate opening to receive the end of the bag, the free end of each member beyond the curved portion being substantially straight, and the offset upon the straight portion of one member adapted to be engaged by the straight portion of the other member.

2. A bag-fastener consisting of two flat members pivotally secured together, the pivoted ends of the members being outwardly curved to form an intermediate opening to receive the end of the bag, the free end of each member beyond the curved portion being substantially straight, and the straight portion of one member being formed with a notch to receive the edge of the opposite member.

In testimony whereof I affix my signature in presence of two witnesses.

HANS G. HANSEN.

Witnesses:
H. S. JOHNSON,
ELGIE H. EVANS.